(12) United States Patent
Tanaka et al.

(10) Patent No.: US 10,121,081 B2
(45) Date of Patent: Nov. 6, 2018

(54) VEHICLE-MOUNTED SENSOR, VEHICLE LAMP, VEHICLE, AND ROAD SURFACE STATE SENSOR

(71) Applicant: SMK Corporation, Tokyo (JP)

(72) Inventors: Tsubasa Tanaka, Tokyo (JP); Haruhiko Kondo, Kanagawa (JP); Natsumi Ito, Tokyo (JP)

(73) Assignee: SMK Corporation, Tokyo (JP)

( * ) Notice: Subject to any disclaimer, the term of this patent is extended or adjusted under 35 U.S.C. 154(b) by 210 days.

(21) Appl. No.: 15/187,796

(22) Filed: Jun. 21, 2016

(65) Prior Publication Data

US 2017/0124402 A1 May 4, 2017

(30) Foreign Application Priority Data

Oct. 29, 2015 (JP) ................... 2015-213232

(51) Int. Cl.
*B60Q 1/14* (2006.01)
*G06K 9/00* (2006.01)
(Continued)

(52) U.S. Cl.
CPC ........... *G06K 9/00791* (2013.01); *B60Q 1/14* (2013.01); *G02B 5/208* (2013.01); *G02B 5/3025* (2013.01);
(Continued)

(58) Field of Classification Search
CPC ............. G06K 9/00791; G06K 9/2018; G06K 9/4661; G06K 9/6267; G02B 5/208;
(Continued)

(56) References Cited

U.S. PATENT DOCUMENTS

2008/0304695 A1 12/2008 Holm et al.
2013/0258108 A1 10/2013 Ono et al.
(Continued)

FOREIGN PATENT DOCUMENTS

| JP | H08-247940 A | 9/1996 |
| JP | 2000-221451 A | 8/2000 |
| JP | 2009-248665 A | 10/2009 |
| JP | 2013-141209 A | 7/2013 |

OTHER PUBLICATIONS

Office Action issued for counterpart Japanese Application 2015-213232, issued by the Japan Patent Office dated Oct. 31, 2017.

*Primary Examiner* — David Porta
*Assistant Examiner* — Faye Boosalis

(57) ABSTRACT

A vehicle-mounted sensor to be mounted on a vehicle includes: a light emission unit that emits infrared light of a first wavelength range and infrared light of a second wavelength range into space outside the vehicle, a water molecule having respective different light absorption factors to the infrared light of the first wavelength range and the infrared light of the second wavelength range; a light detection unit that detects the infrared light of the first wavelength range and the infrared light of the second wavelength range separately; and a water detection unit that detects water in the space outside the vehicle on the basis of a difference between a light amount of the infrared light of the first wavelength range and that of the infrared light of the second wavelength range detected by the light detection unit.

11 Claims, 9 Drawing Sheets

(51) Int. Cl.
*G02B 5/20* (2006.01)
*G02B 5/30* (2006.01)
*G06K 9/46* (2006.01)
*G06K 9/62* (2006.01)
*H04N 5/04* (2006.01)
*H04N 5/33* (2006.01)
*H04N 5/225* (2006.01)
*G06K 9/20* (2006.01)

(52) U.S. Cl.
CPC ......... *G06K 9/2018* (2013.01); *G06K 9/4661* (2013.01); *G06K 9/6267* (2013.01); *H04N 5/04* (2013.01); *H04N 5/2256* (2013.01); *H04N 5/33* (2013.01); *B60Q 2300/312* (2013.01); *G06K 2009/4666* (2013.01)

(58) Field of Classification Search
CPC ...... G02B 5/3058; H04N 5/2256; H04N 5/33; H04N 5/2257; B60Q 1/14
See application file for complete search history.

(56) References Cited

U.S. PATENT DOCUMENTS

| | | | |
|---|---|---|---|
| 2015/0120093 A1* | 4/2015 | Renno | G01N 21/3554 701/3 |
| 2015/0186733 A1* | 7/2015 | Hayakawa | G08G 1/166 382/103 |
| 2017/0109612 A1* | 4/2017 | Mittal | G06K 9/00791 |

* cited by examiner

VEHICLE-MOUNTED SENSOR, VEHICLE LAMP, VEHICLE, AND ROAD SURFACE STATE SENSOR

CROSS REFERENCE TO RELATED APPLICATION

The contents of the following Japanese patent application are incorporated herein by reference, Japanese Patent Application No. 2015-213232 filed on Oct. 29, 2015.

FIELD

The present invention relates to a vehicle-mounted sensor, a vehicle lamp, a vehicle, and a road surface state sensor.

BACKGROUND

A road surface shape recognition apparatus that emits infrared light of a wavelength range corresponding to a wavelength range where external light has the weakest intensity, captures an image, and calculates the shape of a road surface on the basis of the captured image has been known (for example, see Patent Literature 1). An image processing apparatus that efficiently detects a physical object representation by separately performing histogram equalization processing steps for respective independent color pixel matrices forming a color image has been known (for example, see Patent Literature 2).

CITATION LIST

Patent Literature

Patent Literature 1: International Publication No. WO 2012/086070

Patent Literature 2: Japanese Translation of PCT International Application Publication No. 2008-502062

SUMMARY

Technical Problem

There has been a problem that water in space outside a vehicle is unable to be appropriately detected. There has also been a problem that the state of water on a road surface is unable to be appropriately detected.

Solution to Problem

According to a first aspect, a vehicle-mounted sensor to be mounted on a vehicle includes: a light emission unit that emits infrared light of a first wavelength range and infrared light of a second wavelength range into space outside the vehicle, a water molecule having respective different light absorption factors to the infrared light of the first wavelength range and the infrared light of the second wavelength range; a light detection unit that separately detects the infrared light of the first wavelength range and the infrared light of the second wavelength range; and a water detection unit that detects water in the space outside the vehicle on the basis of a difference between a light amount of the infrared light of the first wavelength range and a light amount of the infrared light of the second wavelength range detected by the light detection unit.

The light detection unit may be an imaging apparatus that captures an image of the infrared light of the first wavelength range and an image of the infrared light of the second wavelength range. The water detection unit may detect the water on the basis of a difference between the image of the infrared light of the first wavelength range and the image of the infrared light of the second wavelength range.

The water detection unit may detect the amount of water in each region in the space outside the vehicle to be imaged by the imaging apparatus, on the basis of a difference in a luminance value of each region between the image of the infrared light of the first wavelength range and the image of the infrared light of the second wavelength range.

The water detection unit may detect the amount of water droplets in each region in the space outside the vehicle to be imaged by the imaging apparatus, on the basis of a difference in the luminance value of each region between the image of the infrared light of the first wavelength range and the image of the infrared light of the second wavelength range. The vehicle-mounted sensor may further include an image processing unit that applies haze removal processing to each region of an image obtained by imaging the space outside the vehicle, on the basis of the amount of water droplets in each region detected by the water detection unit.

The light emission unit may emit the infrared light of the first wavelength range and the infrared light of the second wavelength range in a time division manner. The imaging apparatus may capture images in a time division manner in synchronization with the emission of the infrared light of the first wavelength range and the emission of the infrared light of the second wavelength range from the light emission unit, thereby capturing the image of the infrared light of the first wavelength range and the image of the infrared light of the second wavelength range in a time division manner.

The imaging apparatus may include: a light separation unit that separates light incident on the imaging apparatus into the infrared light of the first wavelength range and the infrared light of the second wavelength range; a first imaging unit that captures an image by using the infrared light of the first wavelength range separated by the light separation unit; and a second imaging unit that captures an image by using the infrared light of the second wavelength range separated by the light separation unit.

The water detection unit may detect whether a state of the water in the space outside the vehicle is a liquid phase or a solid phase on the basis of a difference between the light amounts, a difference between an absorption factor of water in the liquid phase to the infrared light of the first wavelength range and an absorption factor of the water to the infrared light of the second wavelength range, and a difference between an absorption factor of water in the solid phase to the infrared light of the first wavelength range and an absorption factor of the water to the infrared light of the second wavelength range.

The light emission unit may emit infrared light of the first wavelength range including a first circular polarization component and infrared light of the second wavelength range including the first circular polarization component to outside the vehicle. The vehicle-mounted sensor may further include a circular polarization filter that transmits a second circular polarization component of light from the space outside the vehicle, the second circular polarization component rotating in a direction opposite to a rotation direction of the first circular polarization component. The light detection unit may detect the infrared light of the first wavelength range and the infrared light of the second wavelength range transmitted through the circular polarization filter.

According to a second aspect, a vehicle lamp includes the foregoing vehicle-mounted sensor, and an illumination light source that emits visible illumination light for illuminating outside the vehicle.

According to a third aspect, a vehicle includes the foregoing vehicle-mounted sensor.

According to a fourth aspect, a road surface state sensor for detecting a state of water on a road surface includes: a light emission unit that emits infrared light of a first wavelength range and infrared light of a second wavelength range into the road surface, a water molecule having respective different light absorption factors to the infrared light of the first wavelength range and the infrared light of the second wavelength range; a light detection unit that separately detects the infrared light of the first wavelength range and the infrared light of the second wavelength range; and a water detection unit that detects whether a state of water on the road surface is a liquid phase or a solid phase on the basis of a difference between a light amount of the infrared light of the first wavelength range and a light amount of the infrared light of the second wavelength detected by the light detection unit, a difference between an absorption factor of water in the liquid phase to the infrared light of the first wavelength range and an absorption factor of the water to the infrared light of the second wavelength range, and a difference between an absorption factor of water in the solid phase to the infrared light of the first wavelength range and an absorption factor of the water to the infrared light of the second wavelength range.

Note that the foregoing summary of the invention does not enumerate all the features of the present invention. Subcombinations of such features may also constitute inventions.

DESCRIPTION OF EMBODIMENTS

The present invention will be described below in conjunction with an embodiment of the invention. The following embodiment is not intended to limit the invention set forth in the claims. All combinations of features described in the embodiment are not necessarily indispensable to the solving means of the invention.

Figure 1:
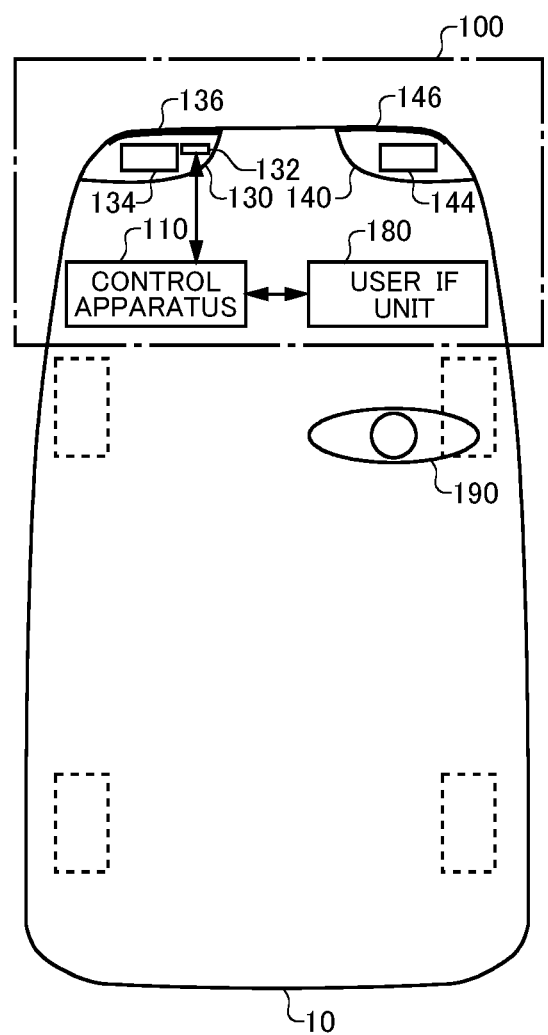
FIG. 1 schematically shows a functional configuration of a vehicle 10 according to an embodiment.

FIG. 1 schematically shows a functional configuration of a vehicle 10 according to an embodiment. In the present embodiment, the vehicle 10 is an automobile. The vehicle 10 includes a vehicle-mounted system 100. The vehicle-mounted system 100 includes a first headlamp unit 130, a second headlamp unit 140, a control apparatus 110, and a user IF unit 180.

The first headlamp unit 130 and the second headlamp unit 140 are examples of a vehicle lamp. The first headlamp unit 130 and the second headlamp unit 140 are arranged in a front part of the vehicle 10. The first headlamp unit 130 is arranged on a left side of the vehicle 10 in a vehicle width direction. The second headlamp unit 140 is arranged on a right side of the vehicle 10 in the vehicle width direction. The first headlamp unit 130 includes an illumination light source 134, a vehicle-mounted sensor 132, and a transparent cover 136. The second headlamp unit 140 includes an illumination light source 144 and a transparent cover 146. The illumination light source 134 and the illumination light source 144 are corresponding members and have generally the same functions. The transparent cover 136 and the transparent cover 146 are corresponding members and have generally the same functions. The first headlamp unit 130 differs from the second headlamp unit 140 in that the vehicle-mounted sensor 132 is included. In the present embodiment, the functions of the first headlamp unit 130 will be mainly described.

The illumination light source 134 emits illumination light for illuminating space outside the vehicle 10. The illumination light source 134 mainly emits visible illumination light. The illumination light source 134 is configured to include a halogen lamp, a xenon lamp, a light-emitting diode (LED), or the like.

The vehicle-mounted sensor 132 obtains information about external space, which is the space outside the vehicle 10, by using light. For example, the vehicle-mounted sensor 132 obtains information about water in the external space of the vehicle 10 by emitting infrared light as detection light into the external space and detecting return light of the infrared light from the external space. Specifically, the vehicle-mounted sensor 132 emits beams of infrared light in wavelength ranges of different wavelengths, and captures images of return light in the respective wavelength ranges. The beams of infrared light emitted from the vehicle-mounted sensor 132 are in different wavelength ranges, and the absorption coefficient of water to the infrared light varies from one wavelength range to another. The images of the respective wavelength ranges captured by the vehicle-mounted sensor 132 thus have differences according to the amount of water in the external space. The vehicle-mounted sensor 132 detects water on the basis of the differences between the captured images of the respective wavelength ranges. For example, on the basis of a differential image between the captured images, the vehicle-mounted sensor 132 detects whether there is water on the road surface and the like, the amount of water on the road surface and the like, whether the road surface is frozen, whether it is foggy, the amount of fog there is, etc. Water is an example of a substance to be detected by the vehicle-mounted sensor 132.

The control apparatus 110 controls the vehicle-mounted sensor 132 and the illumination light source 134. The control apparatus 110 outputs the information detected by the vehicle-mounted sensor 132 to the user IF unit 180. The user IF unit 180 provides a user interface between a user 190, who is a passenger of the vehicle 10, and the vehicle-mounted system 100. For example, the user IF unit 180 includes a display unit, and displays the images captured by the vehicle-mounted sensor 132 on the display unit. For example, if the vehicle-mounted sensor 132 detects ice on the road surface, the user IF unit 180 displays the position where the ice detected by the vehicle-mounted sensor 132 is. The control apparatus 110 may be configured, for example, inside an electronic control unit (ECU) included in the vehicle 10. The control apparatus 110 may be independently configured outside the ECU.

Figure 2:
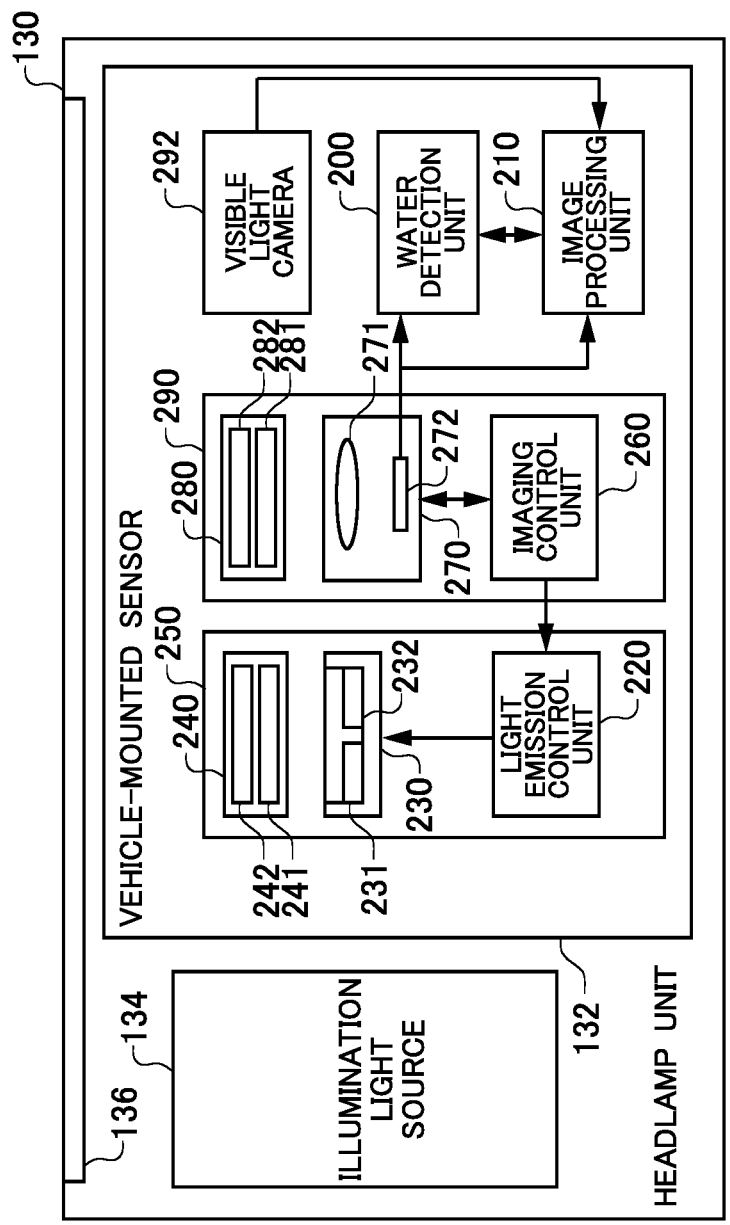
FIG. 2 schematically shows a functional configuration of a first headlamp unit 130.

FIG. 2 schematically shows a functional configuration of the first headlamp unit 130. The illumination light source 134 emits visible illumination light for illuminating the external space which is the space outside the vehicle 10. The illumination light emitted from the illumination light source 134 is emitted into the external space of the vehicle 10 through the transparent cover 136.

The vehicle-mounted sensor 132 includes a light emission unit 250, a detection light camera 290, a visible light camera 292, a water detection unit 200, and an image processing unit 210. The components of the vehicle-mounted sensor 132 as a whole are controlled by the control unit 110. The vehicle-mounted sensor 132 may be provided as one imaging system.

The light emission unit 250 includes a light emission control unit 220, a light source 230, and a first circular polarization filter 240. The light source 230 emits detection light. In the present embodiment, the detection light is infrared rays. More specifically, the detection light may be near infrared light. The detection light may belong to a wavelength range of 800 nm or more and 1000 nm or less. The light source 230 includes a first light emission element 231 and a second light emission element 232. The first light emission element 231 and the second light emission element 232 may be LEDs or the like.

The first light emission element 231 emits infrared light of a first wavelength range. The second light emission element 232 emits infrared light of a second wavelength range different from the first wavelength range. The absorption coefficient of a water molecule to the light of the first wavelength range and that of a water molecule to the light of the second wavelength range are different from each other. The light emission unit 250 can thus emit the infrared light of the first wavelength range and the infrared light of the second wavelength range, to which a water molecule has respective different light absorption factors, into the space outside the vehicle 10. For example, the first wavelength range may be 800 nm or more and 850 nm or less. The second wavelength range may be 940 nm or more and 950 nm or less. The first wavelength range may be 1400 nm or more and 1500 nm or less. The second wavelength range may be 1100 nm or more and 1200 nm or less. The light emitted from the first light emission element 231 and the light emitted from the second light emission element 232 are both projected into the external space of the vehicle 10 through the first circular polarization filter 240 and the transparent cover 136.

The first circular polarization filter 240 converts the infrared light from the light source 230 into first circularly polarized light. For example, the first circularly polarized light is left-handed circularly polarized light which rotates counterclockwise. The first circular polarization filter 240 includes a polarizer 241 and a λ/4 plate 242. The polarizer 241 converts the incident infrared light into linearly polarized light, which is incident on the λ/4 plate 242. The λ/4 plate 242 is arranged with the optical axis of the λ/4 plate 242 at an angle of 45° with respect to the polarization axis of the polarizer 241 so that the incident infrared light is converted into left-handed circularly polarized light. The left-handed circularly polarized light having passing through the λ/4 plate 242, belonging to an infrared wavelength range, is projected into the external space of the vehicle 10 through the transparent cover 136. The λ/4 plate 242 has an appropriate retardation with respect to the infrared light of the first wavelength range and the infrared light of the second wavelength range so that the infrared light of the first wavelength range emitted from the first light emission element 231 and the infrared light of the second wavelength range emitted from the second light emission element 232 are substantially converted into left-handed circularly polarized light. The retardation of the λ/4 plate 242 may be determined in consideration of that of the transparent cover 136 with respect to the infrared light of the first wavelength range and the infrared light of the second wavelength range so that the infrared light of the first wavelength range and the infrared light of the second wavelength range are substantially converted into left-handed circularly polarized light.

As described above, the light emission unit 250 emits the first circularly polarized light converted by the first circular polarization filter 240 into the external space. The light emission unit 250 thereby emits the infrared light of the first wavelength range, including a first circular polarization component, and the infrared light of the second wavelength range, including a first circular polarization component, into the external space of the vehicle 10. The infrared light emitted from the light emission unit 250 is reflected by an object in the external space of the vehicle 10, and part of the light returns to the vehicle 10 as return light. The detection light camera 290 detects the return light from the external space of the vehicle 10.

The detection light camera 290 includes an imaging control unit 260, an imaging apparatus 270, and a second circular polarization filter 280. The return light from the external space of the vehicle 10 passes through the transparent cover 136 and is incident on the detection light camera 290. The light incident on the detection light camera 290 is incident on the second circular polarization filter 280. The second circular polarization filter 280 transmits second circularly polarized light of the light from the external space of the vehicle 10. The second circularly polarized light rotates in a direction opposite to the rotation direction of the first circularly polarized light. For example, the second circularly polarized light is right-handed circularly polarized light which rotates clockwise.

Specifically, the second circular polarization filter 280 includes a polarizer 281 and a λ/4 plate 282. The λ/4 plate 282 has substantially the same retardation as that of the λ/4 plate 242 with respect to the infrared light of the first wavelength range and the infrared light of the second wavelength range. The λ/4 plate 282 is arranged so that the slow axis of the λ/4 plate 282 substantially coincides with that of the λ/4 plate 242 of the light emission unit 250. The light incident on the second circular polarization filter 280 passes through the λ/4 plate 282 and is incident on the polarizer 281. The polarizer 281 is arranged so that the polarization axis of the polarizer 281 forms an angle of 90° with respect to the polarization axis of the polarizer 241 of the light emission unit 250. Of the light from the external space of the vehicle 10, the second circular polarization filter 280 thereby transmits second circularly polarized light belonging to the first wavelength range or the second wavelength range. The light having passed through the second circular polarization filter 280 is incident on the imaging apparatus 270.

The imaging apparatus 270 captures an image by using the light transmitted through the second circular polarization filter of the light from the external space of the vehicle 10. The imaging apparatus 270 includes a lens 271 and an imaging element 272. The lens 271 is an imaging lens. The lens 271 forms an image of the incident light on the imaging element 272. Examples of the imaging element 272 include a CMOS image sensor. The imaging element 272 does not include a color filter. The imaging apparatus 270 does not include an infrared filter for cutting off infrared light. The imaging apparatus 270 may include an infrared filter for cutting off infrared light other than in the first and second wavelength ranges. The imaging element 272 generates an image signal based on the light amount of the incident infrared light. The imaging apparatus 270 captures an image of the infrared light of the first wavelength range and an image of the infrared light of the second wavelength range separately. If infrared light in the wavelength range of 800 nm to 1000 nm is used as the detection light, the imaging apparatus 270 may be able to be constructed by using a visible light camera. For example, the imaging apparatus 270 having sensitivity to the infrared light in the wavelength range of 800 nm to 1000 nm may be able to be constructed by removing an infrared filter from a visible light camera for monochrome imaging.

In the present embodiment, the imaging element 272 does not include a filter for separating the light of the first wavelength range and the light of the second wavelength range. In order for the imaging apparatus 270 to separately capture an infrared light image of the first wavelength range and an infrared light image of the second wavelength range, the light emission unit 250 emits the infrared light of the first wavelength range and the infrared light of the second wavelength range in a time division manner. Specifically, the light emission control unit 220 temporally alternately drives the first light emission element 231 and the second light emission element 232, so that the first light emission element 231 and the second light emission element 232 temporally alternately emit light. The imaging apparatus 270 captures images in a time division manner in synchronization with the emission timing of the infrared light of the first wavelength range and the emission timing of the infrared light of the second wavelength range from the light emission unit 250, whereby the image of the infrared light of the first wavelength range and the image of the infrared light of the second wavelength range are captured in a time division manner. As a result, the imaging apparatus 270 can capture the image of the infrared light of the first wavelength range and the image of the infrared light of the second wavelength range separately. The image signal generated by the imaging element 272 of the imaging apparatus 270 is output to the water detection unit 200 and the image processing unit 210.

The water detection unit 200 detects water on the basis of a difference between the image of the infrared light of the first wavelength range and the image of the infrared light of the second wavelength range captured by the imaging apparatus 270. For example, the water detection unit 200 may detect a region where there is water on the basis of a differential image between the image of the infrared light of the first wavelength range and the image of the infrared light of the second wavelength range captured by the imaging apparatus 270. For example, the water detection unit 200 may detect a region where there is water on the basis of the magnitude of a luminance value in each region of the differential image. The water detection unit 200 may detect the amount of water on the basis of the magnitudes of the luminance values of the differential image. The water detection unit 200 may detect whether it is foggy on the basis of the magnitudes of the luminance values of the differential image. The water detection unit 200 may detect the density of the fog on the basis of the magnitudes of the luminance values of the differential image. The density of the fog may be calculated by using the amount of small water droplets constituting the fog as an index. The water detection unit 200 may detect the density of fog in each region of the differential image on the basis of the magnitude of the luminance value in each region. The density of fog may be the amount of small water droplets constituting the fog. In such a manner, the water detection unit 200 may detect the amount of water in each region in the external space of the vehicle 10 of which an image is captured by the imaging apparatus 270, on the basis of a difference in the luminance value of each region between the image of the infrared light of the first wavelength range and the image of the infrared light of the second wavelength range. The water detection unit 200 may detect the amount of water droplets in each region in the space outside the vehicle 10 to be imaged by the imaging apparatus 270, on the basis of a difference in the luminance value of each region between the image of the infrared light of the first wavelength range and the image of the infrared light of the second wavelength range. The values such as the amount of water and the density of fog detected by the water detection unit 200 may be index values indicating relative values of the amount of water, the density, etc., instead of the absolute values of the amount of water, the density, etc. The result of the water detection by the water detection unit 200 is output to the image processing unit 210.

The visible light camera 292 captures an image of visible light to generate an image signal of a visible light image. The visible light camera 292 is arranged so that an imaging optical axis of the visible light camera 292 substantially coincides with that of the detection light camera 290. The visible light camera 292 is arranged so that an imaging range of the visible light camera 292 substantially coincides with that of the detection light camera 290. The visible light camera 292 may include an infrared filter. The visible light camera 292 may have generally the same configuration as that of the imaging apparatus 270 except that an infrared filter for cutting off light of a wide infrared wavelength range including the first and second wavelength ranges is included. The image signal of the visible light image generated by the visible light camera 292 is output to the image processing unit 210.

The image processing unit 210 applies image processing on the basis of the image signals from the visible light camera 292 and the imaging apparatus 270. The image processing unit 210 may apply image processing according to the result of the water detection by the water detection unit 200. For example, the image processing apparatus 210 may apply image processing for enhancing a region corresponding to a region where water is detected by the water detection unit 200, to the visible light image. The image processing unit 210 applies haze removal processing to each region of an image obtained by imaging the space outside the vehicle, on the basis of the amount of water droplets in each region detected by the water detection unit 200. For example, the image processing unit 210 may apply haze removal processing to each region of the visible light image obtained by the visible light camera 292, on the basis of the amount of water droplets in each region detected by the water detection unit 200. The image processing unit 210 may apply haze removal processing to each region of the infrared light image obtained by the imaging apparatus 270.

The optical axis of the detection light emitted from the detection light camera 290 and the imaging optical axis of the detection light camera 290 generally coincide with the optical axis of the illumination light emitted from the illumination light source 134. If an oncoming vehicle of the vehicle 10 emits detection light like the light emission unit 250 of the vehicle 10, the detection light from the oncoming vehicle can be directly incident on the detection light camera 290. Suppose that the detection light from the oncoming vehicle is left-handed circularly polarized light like the detection light from the light detection unit 250. In such a case, since the detection light camera 290 includes the second circular polarization filter 280, the detection light from the oncoming vehicle is substantially cut off by the second circular polarization filter 280. This can suppress the effect of the detection light from the oncoming vehicle.

Figure 3:
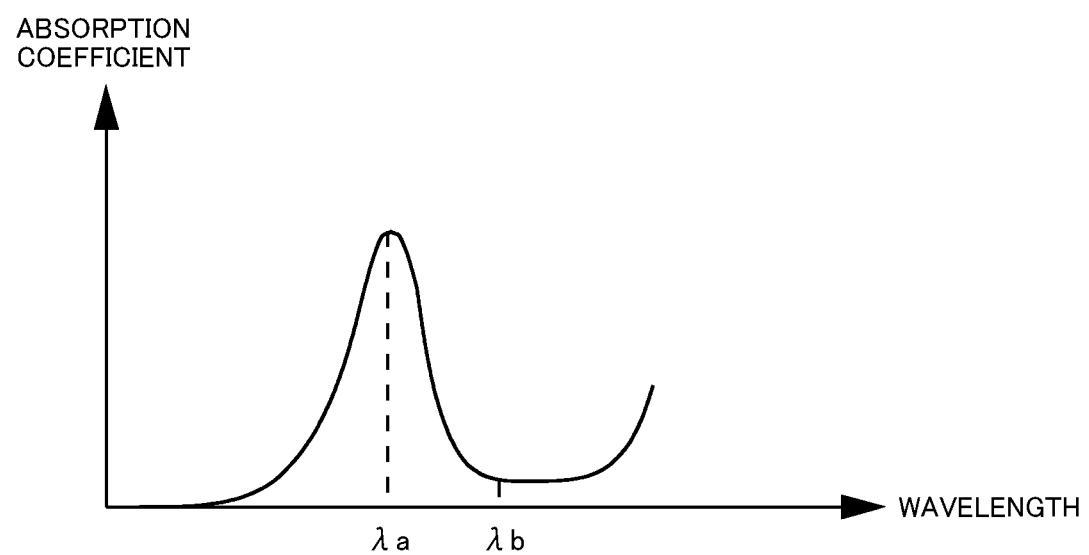
FIG. 3 is a schematic diagram for describing an absorption spectrum of a water molecule.

FIG. 3 is a schematic diagram for describing an absorption spectrum of a water molecule. In the absorption spectrum of a water molecule in FIG. 3, the absorption coefficient at λa is higher than the absorption coefficient at λb. In other words, water absorbs light of λa more strongly than light of λb. Suppose that the absorption coefficients of substances behind the water with respect to the light of λa and the light of λb have a difference smaller than that between the absorption coefficients of the water. In such a case, the infrared light image obtained by the infrared light of λa becomes darker than the infrared light image obtained by the infrared light of λb in an image region or regions corresponding to a region or regions where there is water. The water detection unit 200 then determines that there is water in a region or regions of a differential image obtained by subtracting the infrared light image of λb from the infrared light image of λa where a pixel value indicating a luminance value is higher than a predetermined value. The water detection unit 200 further determines that there is a greater amount of water in a region or regions where the pixel value is higher. For water detection, a plurality of wavelength ranges having different absorption factors can thus be used to detect water more appropriately.

Figure 4:
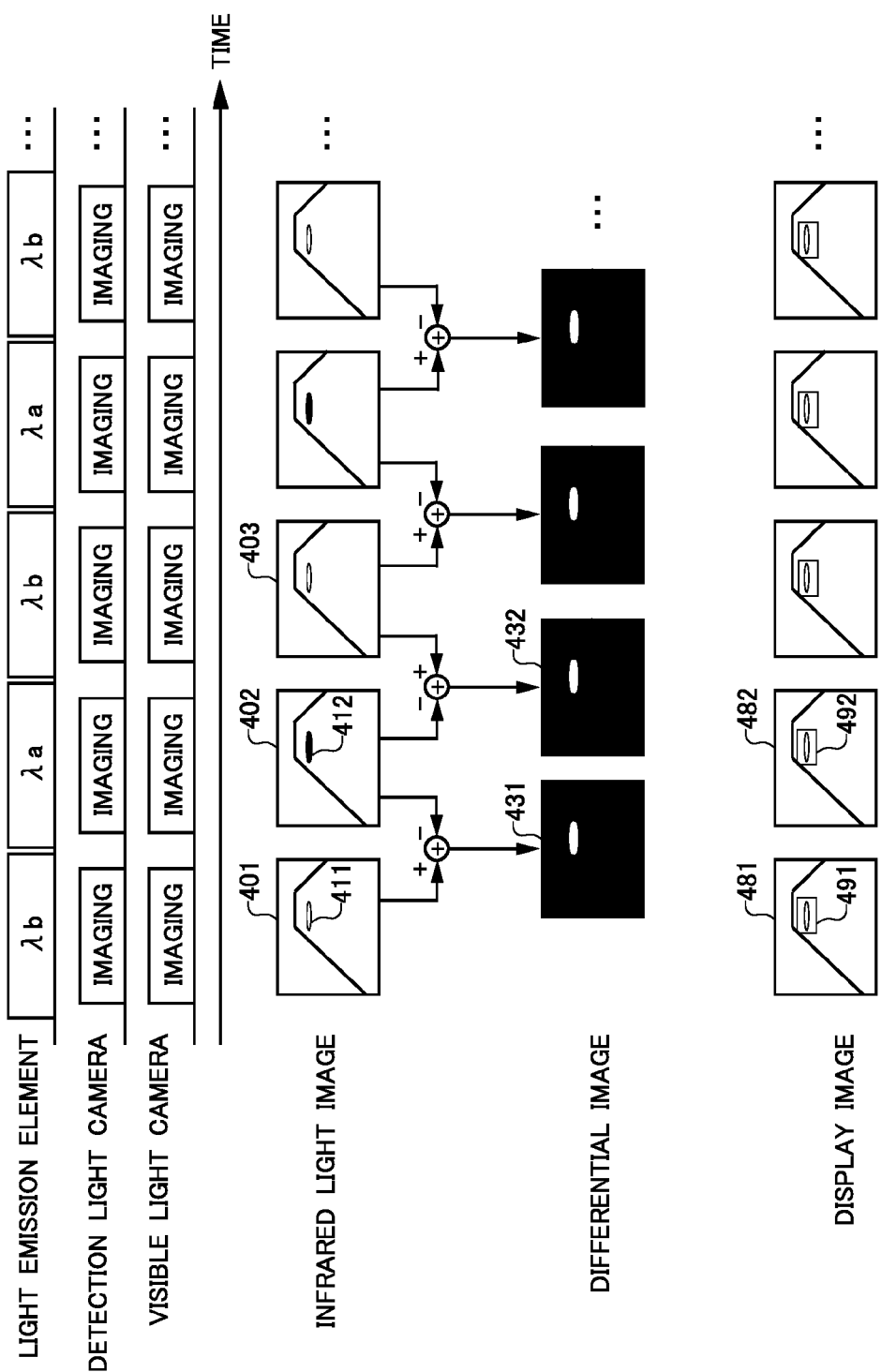
FIG. 4 schematically shows an operation sequence of a vehicle-mounted sensor 132.

FIG. 4 schematically shows an operation sequence of the vehicle-mounted sensor 132. FIG. 4 is an example of the operation sequence when the vehicle-mounted sensor 132 detects the presence of water. The first light emission element 231 emits infrared light of a wavelength range including λa. The second light emission element 232 emits infrared light of a wavelength range including λb. The light emission control unit 220 alternately drives the second light emission element 232 and the first light emission element 231, whereby the infrared light of λb and the infrared light of λa are alternately emitted from the light emission unit 250.

The imaging apparatus 270 captures an image of the infrared light of λb by performing an imaging operation in a period when the infrared light of λb is emitted from the light emission unit 250. In FIG. 4, an infrared light image 401 represents an image captured by using the infrared light of λb. The imaging apparatus 207 captures an image of the infrared light of λa by performing an imaging operation in a period when the infrared light of λa is emitted from the light emission unit 250. In FIG. 4, an infrared light image 402 represents an image captured by using the infrared light of λa. The detection light camera 290 can repeat such operations to capture infrared light images of λb and infrared light images of λa in a time division manner. The light emission control unit 220 obtains a driving signal by which the imaging control unit 260 drives the imaging element 272 from the imaging control unit 260. The light emission control unit 220 then switches the driving of the first light emission element 231 and the second light emission element 232 at timing synchronous with the driving signal. The infrared light images of λb and the infrared light images of λa can thus be separately captured in a time division manner.

A region 411 in the infrared light image 401 and a region 412 in the infrared light image 402 correspond to a region of a pool of water on the road surface. Since the infrared light image 402 is an image of the infrared light having a wavelength of λa, the luminance values in the region of the pool are lower than those of the infrared light image 401.

The water detection unit 200 subtracts the infrared light image 402 obtained by the imaging operation subsequent to the infrared light image 401 from the infrared light image 401 to generate a differential image 431. The water detection unit 200 subtracts the infrared light image 402 from an infrared light image 403 obtained by the imaging operation subsequent to the infrared light image 402 to generate a differential image 432. The water detection unit 200 repeatedly applies the same processing to the infrared light images captured temporally in succession to sequentially generate differential images.

The water detection unit 200 determines a region of the differential image 431 where the pixel values are higher than a predetermined reference value for detecting the presence of water to be a region where there is water. The image processing unit 210 generates a display image by superimposing a mark 491 indicating the presence of water on an image 481 obtained by the imaging operation of the visible light camera 292. Similarly, in the next time step, the water detection unit 200 determines a region where the pixel values are higher than the predetermined value in the differential image 432. The image processing unit 210 generates a display image by superimposing a mark 492 indicating the presence of water on an image 482 obtained by the imaging operation of the visible light camera 292. Such display images are output to the control apparatus 110 and presented to the user 190 via the user IF unit 180. As a result, the user 190 can be notified of the region where there is water.

Figure 5:
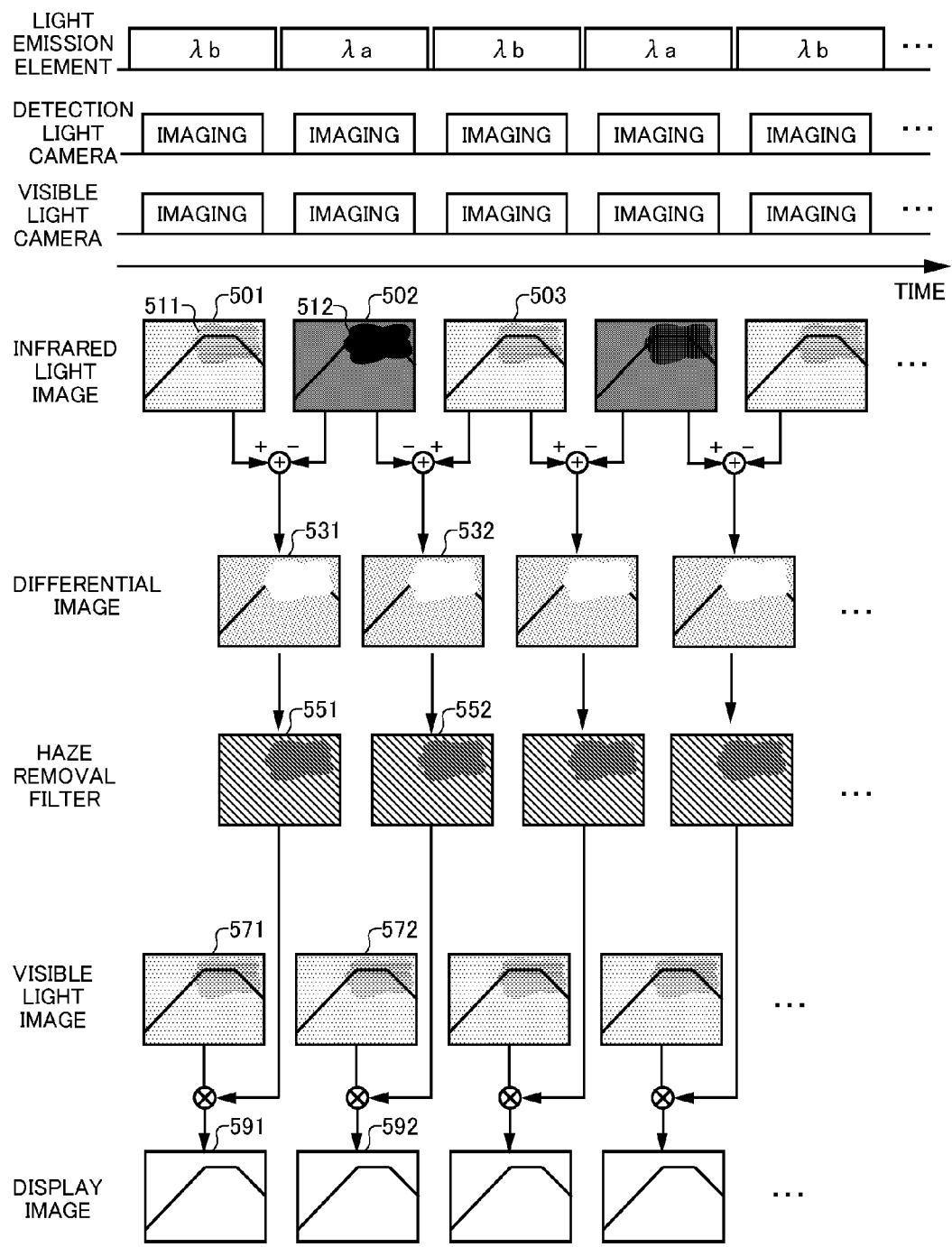
FIG. 5 schematically shows an operation sequence when the vehicle-mounted sensor 132 detects the presence of fog.

FIG. 5 schematically shows an operation sequence when the vehicle-mounted sensor 132 detects the presence of fog. Suppose that there is a fog over the entire imaging range of the detection light camera 290. An operation sequence of the first light emission element 231, the second light emission element 232, and the imaging apparatus 270 is the same as that described in FIG. 4. A description thereof will thus be omitted.

An infrared light image 501 represents an image captured by using the infrared light of λb. An infrared light image 502 represents an image captured by using the infrared light of λa. The infrared light image 502 is the image obtained by the imaging operation subsequent to the infrared light image 501. Since there is a fog over the entire imaging range of the detection light camera 290, the luminance values of the infrared light image 502 are smaller than those of the infrared light image 501 on the whole. A region 511 in the infrared light image 501 and a region 512 in the infrared light image 502 correspond to a region where there is a dense fog. Differences between the luminance values of the region 511 and the luminance values of the region 512 are therefore greater than differences of the luminance values in the other regions.

The water detection unit 200 subtracts the infrared light image 502 from the infrared light image 501 to generate a differential image 531. The water detection unit 200 subtracts the infrared light image 502 from an infrared light image 503 obtained by the imaging operation subsequent to the infrared light image 502 to generate a differential image 532. The water detection unit 200 repeatedly applies the same processing to infrared light images captured temporally in succession to sequentially generate differential images.

The water detection unit 200 extracts a region or regions of the differential image 531 where the pixel values are higher than a predetermined reference value for detecting the presence of fog, and determines that the extracted region(s) is/are the region(s) where there is a fog. The water detection unit 200 may determine that there is a fog if the region(s) of the differential image 531 where the pixel values are higher than the reference value has/have an area greater than a predetermined size. For example, if the ratio of the area of a region where the pixel values are higher than the reference value in the differential image 531 to the total area of the differential image 531 is higher than a predetermined value, the water detection unit 200 may determine that there is a fog. The water detection unit 200 may determine that there is a fog if the amount of blur extracted from at least either one of the infrared light images 501 and 502 is greater than a predetermined amount.

If the water detection unit 200 determines that there is a fog, the image processing unit 210 generates a haze removal filter 551 having strength according to the magnitudes of the pixel values of the differential image 531. The haze removal filter 551 of FIG. 5 schematically expresses the strength of the haze removal processing by the density of the oblique lines. The image processing unit 210 applies the haze removal filter 551 to an image 571 obtained by the imaging operation of the visible light camera 292 to generate a display image 591. As a result, a display image 591 in which haze is suppressed according to the density of the fog can be obtained. Similarly, in the next time step, the image processing unit 210 generates a haze removal filter 552 from a differential image 532. The image processing unit 210 applies the haze removal filter 552 to a visible light image 572 to generate a display image 592. Such display images are output to the control apparatus 110 and presented to the user 190 via the user IF unit 180. Using the vehicle-mounted sensor 132, the density of fog can be appropriately detected to apply haze removal processing of higher strength than in other regions to a region corresponding to a region where there is a dense fog. As a result, uniformly clear display images can be provided to the user 190.

Figure 6:
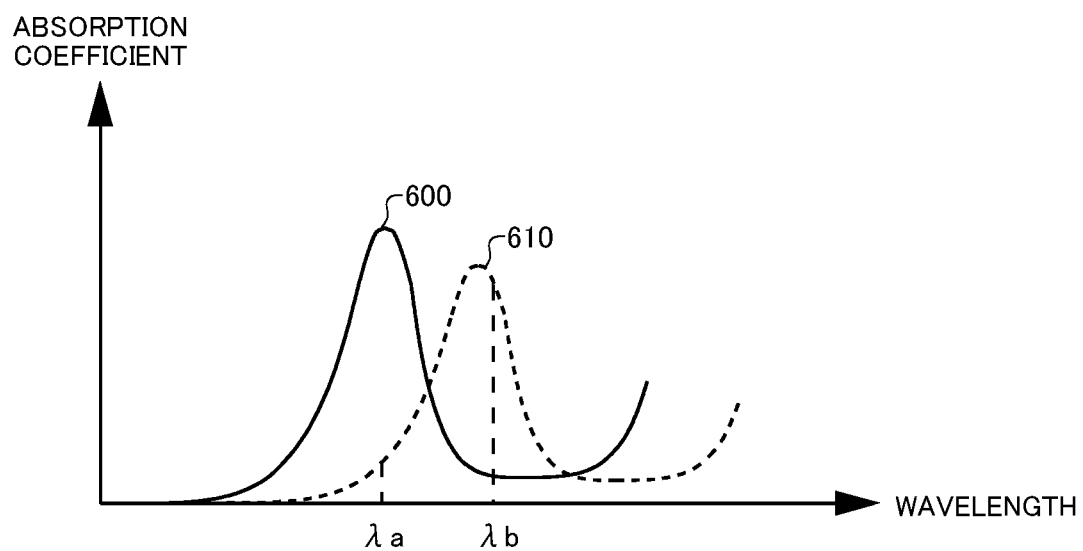
FIG. 6 is a schematic diagram for describing a difference between an absorption spectrum of frozen water and an absorption spectrum of liquid water.

FIG. 6 is a schematic diagram for describing a difference between the absorption spectrum of frozen water and that of liquid water. An absorption spectrum 600 represents the absorption spectrum of liquid water. An absorption spectrum 610 represents the absorption spectrum of frozen water. In general, if water freezes, the absorption spectrum shifts to longer wavelengths as compared to the absorption spectrum 600 of liquid water.

As shown by the absorption spectrum 600, the absorption coefficient of liquid water at $\lambda a$ is higher than that at $\lambda b$. On the other hand, as shown by the absorption spectrum 610, the absorption coefficient of frozen water at $\lambda a$ is lower than that at $\lambda b$. Assume that the absorption coefficients of substances behind the frozen water with respect to the light of $\lambda a$ and the light of $\lambda b$ have a difference smaller than that between the absorption coefficients of frozen water. The infrared light image obtained by the infrared light of $\lambda a$ then becomes brighter than the infrared light image obtained by the infrared light of $\lambda b$ in an image region or regions corresponding to a region or regions where there is frozen water. The water detection unit 200 subtracts the infrared light image of $\lambda b$ from the infrared light image of $\lambda a$ to obtain a differential image. The water detection unit 200 determines that there is frozen water, i.e., ice in a region or regions of the differential image where the pixel values are negative and smaller than a predetermined value. The water detection unit 200 further determines that there is a greater amount of ice in a region where the pixel values are lower among the regions in which there is determined to be ice.

Figure 7:
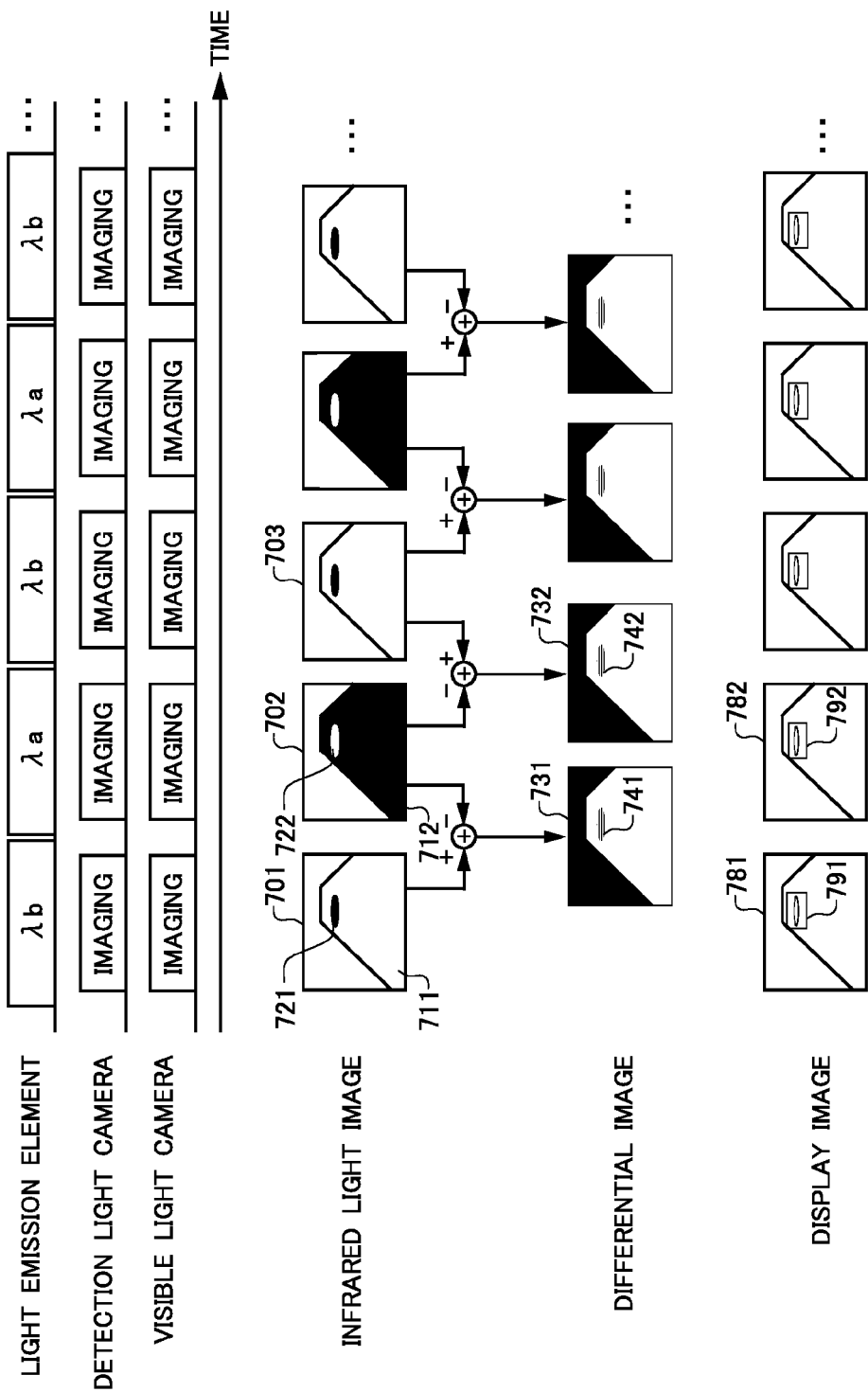
FIG. 7 schematically shows an operation sequence when the vehicle-mounted sensor 132 detects freezing of a road surface.

FIG. 7 schematically shows an operation sequence when the vehicle-mounted sensor 132 detects freezing of the road surface. An operation sequence of the first light emission element 231, the second light emission element 232, and the imaging apparatus 270 is the same as that described in FIG. 4. A description thereof will thus be omitted.

An infrared light image 701 represents an image captured by using the infrared light of $\lambda b$. An infrared light image 702 represents an image captured by using the infrared light of $\lambda a$. The infrared light image 702 is the image obtained by the imaging operation subsequent to the infrared light image 701. Suppose that the road surface is frozen in part and wet in the other regions. A region 711 in the infrared light image 701 and a region 712 in the infrared light image 702 correspond to the wet portion of the road surface. A region 721 in the infrared light image 701 and a region 722 in the infrared light image 702 correspond to the frozen portion of the road surface. As described above, in the case of liquid water, the absorption coefficient at $\lambda a$ is higher than that at $\lambda b$. The luminance values in the region 712 corresponding to the wet state are thus smaller than those in the corresponding region 711. On the other hand, in the case of frozen water, the absorption coefficient at $\lambda a$ is lower than that at $\lambda b$. The luminance values in the region 722 corresponding to the frozen state are thus higher than those in the corresponding region 721.

The water detection unit 200 subtracts the infrared light image 702 from the infrared light image 701 to generate a differential image 731. The water detection unit 200 substrates the infrared light image 702 from an infrared light image 703 obtained by the imaging operation subsequent to the infrared light image 702 to generate a differential image 732. The water detection unit 200 repeatedly applies the same processing to infrared light images captured in succession to sequentially generate differential images.

The water detection unit 200 determines a region or regions of a differential image 731 where the pixel values are greater than the predetermined value for detecting the presence of water to be a region or regions where there is water. The water detection unit 200 determines a region or regions of the differential image 731 where the pixel values are negative and smaller than a predetermined reference value for detecting the presence of ice to be a region or regions where there is ice. For example, the water detection unit 200 determines a region 741 in the differential image 731 to be a region where there is ice. In such a manner, the water detection unit 200 can detect whether the state of water is the liquid phase or the solid phase on the basis of a difference in the light amount, a difference between the absorption factor of water in the liquid phase to the infrared light of the first wavelength range and that to the infrared light of the second wavelength range, and a difference between the absorption factor of water in the solid phase to the infrared light of the first wavelength range and that to the infrared light of the second wavelength range. For example, the water detection unit 200 can detect whether the state of water on the road surface is the liquid phase or the solid phase on the basis of a difference between the light amount of the infrared light of the first wavelength range and the light amount of the infrared light of the second wavelength range detected in a region corresponding to the road surface, a difference between the absorption factor of water in the liquid phase to the infrared light of the first wavelength range and that to the infrared light of the second wavelength range, and a difference between the absorption factor of water in the solid phase to the infrared light of the first wavelength range and that to the infrared light of the second wavelength range.

The image processing unit 210 generates a display image by superimposing a mark 791 indicating the presence of ice on an image 781 obtained by the imaging operation of the visible light camera 292. Similarly, in the next time step, the water detection unit 200 detects a region 742 where there is ice in the differential image 732. The image processing unit 210 generates a display image by superimposing a mark 792 indicating the presence of ice on an image 782 obtained by the imaging operation of the visible light camera 292. Such display images are output to the control apparatus 110 and presented to the user 190 via the user IF unit 180. As a result, the user 190 can be notified of the frozen region.

The vehicle-mounted system 100 described above may employ a configuration that the vehicle-mounted sensor 132 does not include the visible light camera 292. In such a configuration, the imaging apparatus 270 may be used to capture a visible light image. For example, the operation sequence of FIG. 4 may include a period where the light emission unit 250 does not emit infrared light, between the imaging timing of the infrared light image 402 and the imaging timing of the infrared light image 403. The imaging apparatus 270 may be driven to capture a visible light image in that period.

As described above, according to the vehicle-mounted system 100, the vehicle-mounted sensor 132 mounted on the vehicle 10 can appropriately detect information about water in the external space of the vehicle 10 by using the detection light of the two wavelength ranges in which water has different absorption coefficients. On the basis of the detected information about water, the vehicle-mounted system 100 can provide appropriate information to the user 190 who is a passenger of the vehicle 10. For example, the user 190 can be notified of the presence of a pool of water. An image with reduced effect of fog can be provided to the user 190. The user 190 can be notified of the presence of frozen water.

Figure 8:
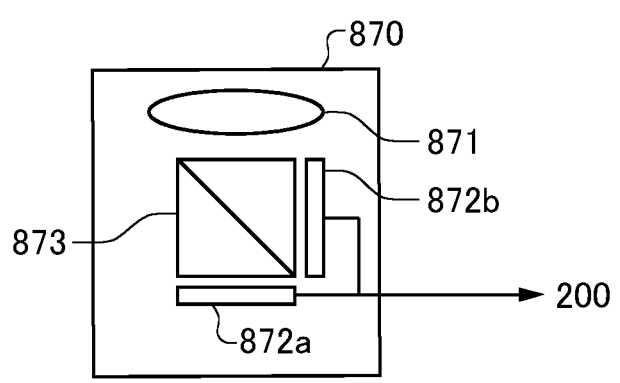
FIG. 8 schematically shows a block configuration of an imaging apparatus 870 as a modification of an imaging apparatus 270.

FIG. 8 schematically shows a block configuration of an imaging apparatus 870 which is a modification of the imaging apparatus 270. The imaging apparatus 870 includes a lens 871, a light separation unit 873, an imaging element 872a, and an imaging element 872b.

The lens 871 is an imaging lens. Light having passed through the lens 871 is incident on the light separation unit 873. The light separation unit 873 separates the light incident on the imaging apparatus 870 into infrared light of the first wavelength range and infrared light of the second wavelength range. For example, the light separation unit 873 is a dichroic mirror. Specifically, the light separation unit 873 transmits the infrared light of the first wavelength range and reflects the infrared light of the second wavelength range.

The imaging element 872a is arranged on the optical path of the infrared light of the first wavelength range transmitted through the light separation unit 873. The imaging element 872a captures an image by using the infrared light of the first wavelength range separated by the light separation unit 873. The imaging element 872b is arranged on the optical path of the infrared light of the second wavelength range reflected by the light separation unit 873. The imaging element 872b captures an image by using the infrared light of the second wavelength range separated by the light separation unit 873. The imaging element 872a may include an infrared filter that selectively transmits the infrared light of the first wavelength range. The imaging element 872b may include an infrared filter that selectively transmits the infrared light of the second wavelength range. The imaging apparatus 870 can be used to separate the infrared light of the first wavelength range and the infrared light of the second wavelength range from the incident light, and capture an image of the infrared light of the first wavelength range and an image of the infrared light of the second wavelength range separately at the same timing.

Figure 9:
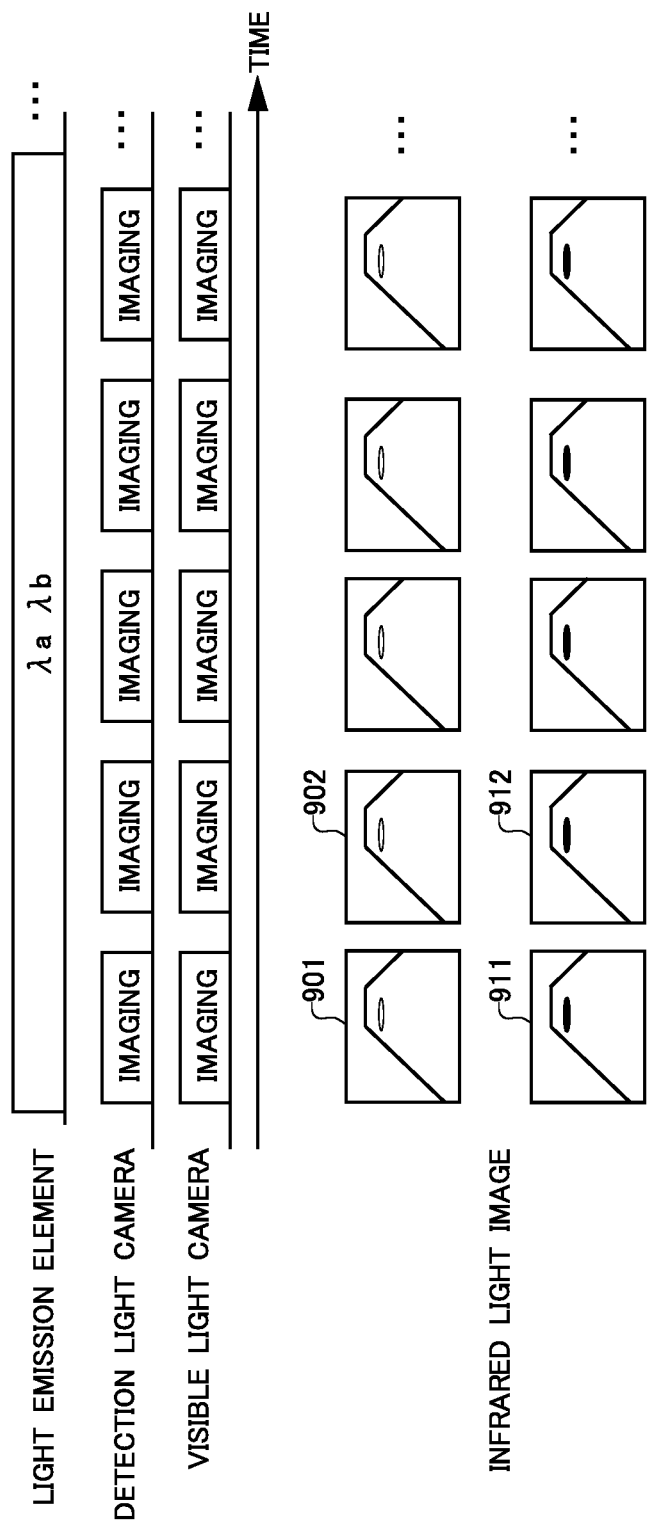
FIG. 9 schematically shows an operation sequence when the imaging apparatus 870 is used.

FIG. 9 schematically shows an operation sequence of the vehicle-mounted sensor 132 when the imaging apparatus 870 is used. FIG. 9 is an operation sequence corresponding to FIG. 4. The light emission control unit 220 drives both the first light emission element 231 and the second light emission element 232 so that the infrared light of the first wavelength range and the infrared light of the second wavelength range are continuously emitted from the light emission unit 250. The imaging apparatus 870 captures an infrared light image resulting from the infrared light of λa and an infrared light image resulting from the infrared light of λb at each imaging timing. For example, an exposure period of the imaging element 872a which captures an infrared light image 901 is the same as that of the imaging element 872b which captures an infrared light image 911. An infrared light image 902 and an infrared light image 912 are images of the imaging timing subsequent to the infrared light image 901 and the infrared light image 911. The exposure period of the imaging element 872a which captures the infrared light image 902 is the same as that of the imaging element 872b which captures the infrared light image 912.

The water detection unit 200 subtracts the infrared light image 911 from the infrared light image 901 to generate a differential image corresponding to the differential image 431 of FIG. 4. The processing of the image processing unit 210 based on the differential image may be the same as that described in conjunction with FIG. 4 etc. A description thereof will thus be omitted. Since the imaging apparatus 870 can be used to capture the images of the infrared light of different wavelength ranges, the time for obtaining the infrared light images needed to detect water can be reduced.

Instead of a dichroic mirror, a combination of a beam splitter and infrared filters may be applied to the light separation unit 873 of the imaging apparatus 870. For example, a half mirror may be used as part of the light separation unit 873. An infrared filter for selectively transmitting the infrared light of the first wavelength range may be arranged between the emission surface of transmitted light of the half mirror and the imaging element 872a. An infrared filter for selectively transmitting the infrared light of the second wavelength range may be arranged between the emission surface of reflected light of the half mirror and the imaging element 872b.

As another example of the wavelength separation method, an infrared light filter in which a plurality of types of infrared filter units having respective different transmission wavelength ranges are arranged in a two-dimensional configuration may be used. For example, infrared filter elements for selectively transmitting the infrared light of the first wavelength range and infrared filter elements for selectively transmitting the infrared light of the second wavelength range may be arranged in a two-dimensional matrix to form an infrared filter. An imaging element including photoelectric conversion elements corresponding to the respective infrared filter elements may then be arranged in front of the infrared filter. In such a configuration, an imaging unit for capturing an image by using the infrared light of the first wavelength range is formed by a plurality of pairs of infrared filter elements for selectively transmitting the infrared light of the first wavelength range and photoelectric conversion elements corresponding to the infrared filter elements. Similarly, an imaging unit for capturing an image by using the infrared light of the second wavelength range is formed by a plurality of pairs of infrared filter elements for selectively transmitting the infrared light of the second wavelength range and photoelectric conversion elements that receive the infrared light transmitted through the infrared filter elements. In such a manner, a single imaging element can be used to separately capture an image of the infrared light of the first wavelength range and an image of the infrared light of the second wavelength range.

According to the imaging apparatus 270, the imaging apparatus 870, and the modifications described above, the infrared light images can be captured on the same imaging optical axis. As another example of the imaging apparatus for capturing the infrared light images, an imaging apparatus for capturing an image by using the infrared light of the first wavelength range and an imaging apparatus for capturing an image by using the infrared light of the second wavelength range may be provided separately.

In the foregoing embodiment, the vehicle-mounted sensor 132 is described to be configured to include the imaging apparatus. However, the imaging apparatus is an example of a light detection unit for detecting light. A vehicle-mounted sensor configured to not capture an image may be employed. For example, a light reception element may be applied to a light detection unit for detecting water. The light reception element may be configured to detect the infrared light of the first wavelength range and the infrared light of the second wavelength range in a time division manner, and detect water on the basis of a difference between the detected light amounts of the infrared light of the first wavelength range and the infrared light of the second wavelength range. In another mode, light reception elements may be provided for respective wavelength ranges of detection light. For example, a configuration including a light reception element for receiving the infrared light of the first wavelength range and a light reception element for receiving the infrared light of the second wavelength range may be employed. Even in such modes, the configuration using circularly polarized light as the detection light may be employed.

In the foregoing embodiment, the infrared light is described to be used as the detection light for the purpose of detecting water. However, the object to be detected is not limited to water. A configuration similar to that described in the present embodiment may be applied to various objects to be detected other than water. The wavelength ranges of the detection light may be appropriately selected according to the object to be detected. Various wavelength ranges other than infrared wavelength ranges may be selected as the wavelength ranges of the detection light. Examples include visible wavelength ranges and ultraviolet wavelength ranges. That is, light of at least two types of wavelength ranges in which the substance to be detected has respective different light absorption factors may be used as the detection light. Even in such a case, like the foregoing embodiment, first circularly polarized light can be applied to the irradiating detection light. In such a case, the detection light camera 290 can capture images of the light transmitted through the second circular polarization filter 280 at respective wavelength ranges. The substance to be detected can be detected on the basis of a different between the captured images of the respective wavelength ranges.

The foregoing embodiment has dealt with the configuration using circularly polarized light of infrared wavelength ranges, rotating in a specific direction, for the purpose of suppressing disturbance by external light. However, the detection light does not need to be circularly polarized light. For example, substantially unpolarized light may be employed as the detection light. The configuration using circularly polarized light as the detection light is applicable not only to the vehicle-mounted sensor 132 which detects a specific object to be detected, but also to a color camera or monochrome camera which captures an image of the external space of the vehicle 10.

At least some of the functions of the vehicle-mounted system 100 described above may be implemented by a processor such as an MPU. For example, the vehicle-mounted sensor 132 may include a CPU, a memory, and a storage device. The functions of the vehicle-mounted sensor 132, namely, the functions of the light emission control unit 220, the imaging control unit 260, the water detection unit 200, and the image processing unit 210, may be implemented by the CPU loading a program stored in the storage device into the memory and executing the program. The program may be provided for the vehicle-mounted system 100 via a machine-readable medium such as a CD-ROM. The program may be provided for the vehicle-mounted system 100 via a network. The functions of the water detection unit 200 and the image processing unit 210 may be implemented not inside the vehicle-mounted sensor 132 but by an external device of the vehicle-mounted sensor 132. For example, the water detection unit 200 and the image processing unit 210 may be implemented on the control apparatus 110.

In the foregoing embodiment, the automobile is described as an example of the vehicle 10. However, the vehicle is a concept that is not limited to an automobile but includes various vehicles such as a train. At least part of the configuration described in conjunction with the vehicle-mounted system 100 may be applied to various objects other than vehicles. Examples thereof include a street lamp, a utility pole, a traffic light, and structures such as a building and a bridge. For example, configurations similar to various modes of the vehicle-mounted sensor 132 according to the foregoing vehicle-mounted system 100 may be applied to a road surface state sensor that detects the state of water on a road surface of a road, a rail track, and the like by detecting return light of detection light emitted to the road surface. The road surface state sensor may be arranged on a street lamp, a traffic light, or other object lying near or over a passage such as a road and a rail track. It should be noted that the road is a concept including a street. For example, the road surface is a concept that is not limited to a road surface over which vehicles pass, and includes a road surface of a road over which no vehicle passes, and those of streets and sidewalks. In other words, sensors having similar configurations to various modes of the vehicle-mounted sensor 132 are applicable not only as vehicle sensors but also non-vehicle road surface state sensors.

The present invention has been described above in conjunction with the embodiment thereof. However, the technical scope of the present invention is not limited to the scope described in the foregoing embodiment. It will be obvious to those skilled in the art that various modifications or improvements may be made to the foregoing embodiment. It should be appreciated from the description of the scope of claims that such modified or improved modes are also encompassed by the technical scope of the present invention.

It should be noted that the processing of the operations, procedures, steps, phases, and the like of the apparatuses, system, program, and method described in the claims, the description, and the drawings may be executed in arbitrary order unless explicitly specified otherwise, like "before," "prior to," etc., or unless an output of preceding processing is used by subsequent processing. Even if an operation flow in the claims, the description, or the drawings is described by using terms such as "initially" and "next" for convenience's sake, the operation flow does not necessarily need to be performed in such order.

REFERENCE SIGNS LIST 10 vehicle
100 vehicle-mounted system
110 control apparatus
130 first headlamp unit
132 vehicle-mounted sensor
134 illumination light source
136 transparent cover
140 second headlamp unit
144 illumination light source
146 transparent cover
180 user IF unit
190 user
200 water detection unit
210 image processing unit
220 light emission control unit
230 light source
231 first light emission element
232 second light emission element
240 first circular polarization filter
241 polarizer
242 λ/4 plate
250 light emission unit
260 imaging control unit
270 imaging apparatus
271 lens
272 imaging element
280 second circular polarization filter
281 polarizer
282 λ/4 plate
290 detection light camera
292 visible light camera
401, 402, 403 infrared light image
411, 412 region
431, 432 differential image
481, 482 image
491, 492 mark
501, 502, 503 infrared light image
511, 512 region
531, 532 differential image
551, 552 haze removal filter
571 image
572 visible light image
591, 592 display image
600, 610 absorption spectrum
701, 702, 703 infrared light image
711, 712, 721, 722 region
731, 732 differential image
741, 742 region
781, 782 image
791, 792 mark
870 imaging apparatus
871 lens
872 imaging element
873 light separation unit
901, 902, 911, 912 infrared light image

The invention claimed is:

1. A vehicle-mounted sensor to be mounted on a vehicle, comprising:
a light emission unit for emitting infrared light of a first wavelength range and infrared light of a second wavelength range into space outside the vehicle, a water molecule having respective different light absorption factors to the infrared light of the first wavelength range and the infrared light of the second wavelength range;
a light detection unit for separately detecting the infrared light of the first wavelength range and the infrared light of the second wavelength range;
a water detection unit for detecting an amount of water droplets in a region outside the vehicle on a basis of a difference between a light amount of the infrared light of the first wavelength range and a light amount of the infrared light of the second wavelength range detected by the light detection unit; and
an image processing unit for applying haze removal processing to each region of an image obtained by imaging the space outside the vehicle, on a basis of the amount of water droplets in each region detected by the water detection unit.

2. The vehicle-mounted sensor according to claim 1, wherein
the light detection unit is an imaging apparatus for capturing an image of the infrared light of the first wavelength range and an image of the infrared light of the second wavelength range, and
the water detection unit detects the amount of water droplets on a basis of a difference between the image of the infrared light of the first wavelength range and the image of the infrared light of the second wavelength range.

3. The vehicle-mounted sensor according to claim 2, wherein
the water detection unit detects the amount of water droplets in each region in the space outside the vehicle to be imaged by the imaging apparatus, on a basis of a difference in a luminance value of each region between the image of the infrared light of the first wavelength range and the image of the infrared light of the second wavelength range.

4. The vehicle-mounted sensor according to claim 2, wherein
the light emission unit emits the infrared light of the first wavelength range and the infrared light of the second wavelength range in a time division manner, and
the imaging apparatus captures images in a time division manner in synchronization with the emission of the infrared light of the first wavelength range and the emission of the infrared light of the second wavelength range from the light emission unit, thereby capturing the image of the infrared light of the first wavelength range and the image of the infrared light of the second wavelength range in a time division manner.

5. The vehicle-mounted sensor according to claim 2, wherein
the imaging apparatus includes:
a light separation unit for separating light incident on the imaging apparatus into the infrared light of the first wavelength range and the infrared light of the second wavelength range;

a first imaging unit for capturing an image by using the infrared light of the first wavelength range separated by the light separation unit; and a second imaging unit for capturing an image by using the infrared light of the second wavelength range separated by the light separation unit.

6. The vehicle-mounted sensor according to claim 1, wherein the water detection unit detects whether a state of the water droplets in the space outside the vehicle is a liquid phase or a solid phase on a basis of a difference between the light amounts, a difference between an absorption factor of water in the liquid phase to the infrared light of the first wavelength range and an absorption factor of the water to the infrared light of the second wavelength range, and a difference between an absorption factor of water in the solid phase to the infrared light of the first wavelength range and an absorption factor of the water to the infrared light of the second wavelength range.

7. The vehicle-mounted sensor according to claim 1, wherein the light emission unit emits infrared light of the first wavelength range including a first circular polarization component and infrared light of the second wavelength range including the first circular polarization component to outside the vehicle, the vehicle-mounted sensor further comprises a circular polarization filter for transmitting a second circular polarization component of light from the space outside the vehicle, the second circular polarization component rotating in a direction opposite to a rotation direction of the first circular polarization component, and the light detection unit detects the infrared light of the first wavelength range and the infrared light of the second wavelength range transmitted through the circular polarization filter.

8. A vehicle lamp comprising:

the vehicle-mounted sensor according to claim 1; and an illumination light source for emitting visible illumination light for illuminating outside the vehicle.

9. The vehicle-mounted sensor according to claim 1, wherein the amount of water droplets in each region is a density of fog.

10. A road surface state sensor for detecting a state of water on a road surface, comprising:

a light emission unit for emitting infrared light of a first wavelength range and infrared light of a second wavelength range into the road surface, a water molecule having respective different light absorption factors to the infrared light of the first wavelength range and the infrared light of the second wavelength range;

a light detection unit for separately detecting the infrared light of the first wavelength range and the infrared light of the second wavelength range;

a water detection unit for detecting whether a state of water on the road surface is a liquid phase or a solid phase on a basis of a difference between a light amount of the infrared light of the first wavelength range and a light amount of the infrared light of the second wavelength detected by the light detection unit, a difference between an absorption factor of water in the liquid phase to the infrared light of the first wavelength range and an absorption factor of the water to the infrared light of the second wavelength range, and a difference between an absorption factor of water in the solid phase to the infrared light of the first wavelength range and an absorption factor of the water to the infrared light of the second wavelength range; and an image processing unit for applying haze removal processing to each region of an image obtained by imaging a space outside the vehicle, on a basis of an amount of water in each region detected by the water detection unit.

11. The road surface state sensor for detecting a state of water on a road surface according to claim 10, wherein the amount of water droplets in each region is a density of fog.

* * * * *